April 20, 1954 E. H. HUGENHOLTZ 2,676,262
AUTOMATIC FREQUENCY CONTROL SYSTEM FOR OSCILLATORS
Filed March 20, 1951
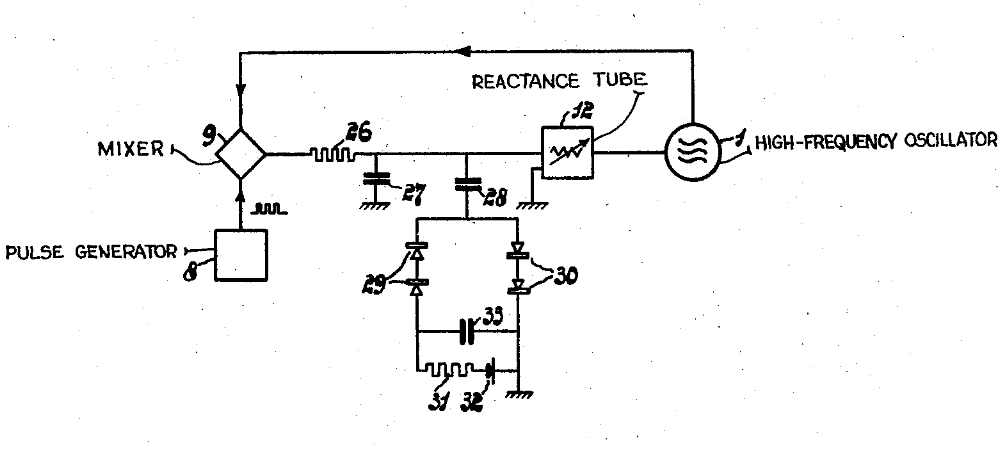
INVENTOR
EDUARD HERMAN HUGENHOLTZ
BY
AGENT Patented Apr. 20, 1954 2,676,262

UNITED STATES PATENT OFFICE 2,676,262

AUTOMATIC FREQUENCY CONTROL SYSTEM FOR OSCILLATORS

Eduard Herman Hugenholtz, Hilversum, Netherlands, assignor to Hartford National Bank and Trust Company, Hartford, Conn., as trustee Application March 20, 1951, Serial No. 216,494

Claims priority, application Netherlands March 29, 1950

5 Claims. (Cl. 250—36)

This invention relates to an improvement in or modification of the invention described and claimed in the copending U. S. patent application No. 76,976, now U. S. Patent No. 2,617,037. In the said specification is described a circuit-arrangement comprising an oscillator and provided with means for automatic frequency correction of the oscillations produced by the oscillator in accordance with a control-voltage which contains direct and alternating voltages and is supplied through a control-voltage channel to the A. F. C.-means, the control-voltage channel being arranged so that the ratio of the transmission factors for direct and alternating control-voltages increases with relatively equal and jointly decreasing voltage amplitudes.

This circuit-arrangement according to the above-noted copending application has the advantage that the effect of alternating interference voltages occurring across the control-voltage channel and which are liable to affect the stabilisation of the oscillator is materially restricted. According to the embodiment indicated in the copending application, in order to attain this object the control-voltage channel is split up into two branches, one of which is cut off for direct voltages, the other comprising two oppositely arranged biased diodes which retain alternating control-voltages of small amplitude. Alternating voltages of higher amplitudes overcome the threshold voltage of the diodes and are passed on substantially unattenuated.

In the embodiment according to the copending application, the use of diodes comprising each a thermionic cathode was considered. It has been found in practice that the use of diodes indirectly heated by alternating current sometimes has the effect of introducing troublesome hum voltages into the control-voltage channel.

This disadvantage could be obviated by the use of rectifying cells each comprising a cold cathode but such cells have a high impedance which is undesirable in the present arrangement.

The present invention has for its object to provide a variant of circuit-arrangements of the type indicated in the copending application, in which the said disadvantages are obviated.

According to the present invention, the control-voltage channel comprises a transverse impedance, which is cut off for direct control-voltages and which is constituted by a detector circuit having one or more positively biased rectifying cells.

In order that the invention may be readily carried into effect, an example will now be described in detail with reference to the accompanying drawing.

The single figure of the drawing shows a circuit-arrangement which in broad outlines is similar to that of the copending application, parts exactly similar to those shown in the copending application being shown in block diagram form for the sake of simplicity. A pulse generator 8 furnishes a pulsatory voltage yielding a higher harmonic frequency with respect to which the frequency of a high-frequency oscillator is required to be stabilized. For this purpose the output voltages of the pulse generator 8 and the high-frequency oscillator 1 are fed to a phase detector constituted by a mixer 9. The output voltage of the phase detector which contains alternating and direct voltage components is supplied through an appropriately arranged control-voltage channel to a reactance tube 12 connected in parallel with the frequency-determining circuit of the high-frequency oscillator 1.

The control-voltage channel comprises, apart from a low-pass filter having a longitudinal resistance 26 and a transverse capacitor 27, a transverse impedance connected to the junction point between the longitudinal resistance 26 and the capacitor 27. This transverse impedance is constituted by the series combination of a capacitor 28 and four rectifying cells 29 and 30 oppositely arranged in pairs. The anode of the pair of cells 29 and the cathode of the pair of cells 30 are directly connected to the input terminal of the capacitor 28. The other ends of the pairs of cells 29 and 30 are interconnected through the series combination of a resistance 31 and a bias voltage battery 32, this series combination being shunted by a capacitor 33.

The pairs of cells 29, 30, the resistance 31 and the capacitor 33 constitute a detector circuit, which has a positive biasing voltage supplied by the bias voltage battery 32. For alternating voltages of low amplitude the said detector circuit constitutes a comparatively low resistance. However, as soon as alternating voltages the amplitude of which is higher than the biasing voltage of the battery 32 are supplied to the detector circuit, rectification occurs resulting in a direct output voltage counteracting the biasing voltage. The output voltage brings about such a shift of the working point of the detector circuit that in the case of an appreciable alternating voltage amplitude the detector is cut off for the greater part of the cycles of the alternating voltage. Consequently, the transverse impedance behaves as a comparatively heavy resistance.

For direct voltages the transverse impedance is cut off, in the present case by the blocking capacitor 28. The transmission factor of the control-voltage channel for direct voltages is consequently not affected by the transverse impedance. On the other hand, alternating voltages of low amplitude are transmitted poorly by reason of the comparatively low transverse resistance, in contradistinction to alternating voltages of comparatively high amplitude. The ratio between the transmission factors of the control-voltage channel for direct and alternating control-voltages consequently varies in the circuit-arrangement shown in the desired manner. By suitable choice of the longitudinal resistance 26 and the transverse capacitor 27 in connection with the minimum transverse impedance, very great supplementary damping in the control-voltage channel can be obtained for alternating voltages of low amplitude, as compared with that for alternating voltages of great amplitude.

What I claim is:

1. In an automatic frequency control system wherein the frequency of the wave produced by a controlled oscillator is compared in a phase detector with the frequency of a reference oscillation to produce a control voltage having direct and alternating voltage components depending on the displacement between the wave and the referenec oscillation, said control voltage being applied to a voltage-responsive frequency control device coupled to said oscillator; a transmission channel for coupling said phase detector to said frequency control device and having a characteristic whereby the ratio between the transmission factors for said direct and alternating voltage components increases with relatively equal and jointly decreasing voltage amplitudes, said transmission channel comprising a direct current path for conveying said control voltage to said control device, and a transverse impedance across said path, said impedance including means blocking said impedance to the direct-voltage component and a detector circuit provided with at least one rectifying cell and means positively biasing said cell to cut-off said detector circuit for the greater part of the cycle for relatively high alternating voltage amplitudes.

2. A circuit-arrangement, as set forth in claim 1, wherein said detector circuit includes a pair of rectifying cells each having a cathode and an anode, the cathode of one cell being connected to the anode of the other cell, a resistance, and a bias voltage source connected through said resistance between the anode of said one cell and the cathode of said other cell.

3. A circuit-arrangement, as set forth in claim 2, wherein said direct current path is constituted by a resistor adapted to be connected between the output of the phase detector and the input of the control device, and a condenser connected between the input of the device and ground.

4. A circuit-arrangement, as set forth in claim 3, wherein said detector circuit further includes a second condenser connected across the series connection of said resistance and said source.

5. A circuit-arrangement, as set forth in claim 4, wherein said blocking means is constituted by a third condenser connected between the input of said device and the interconnection between the cathode of said one cell and the anode of the other cell.

References Cited in the file of this patent

UNITED STATES PATENTS

| Number | Name | Date |
|---|---|---|
| 2,351,212 | Houghton | June 13, 1944 |
| 2,377,327 | Seeley | June 5, 1945 |
| 2,406,125 | Ziegler et al. | Aug. 20, 1946 |